(12) United States Patent
Kotani et al.

(10) Patent No.: US 7,825,563 B2
(45) Date of Patent: Nov. 2, 2010

(54) INSULATOR FOR ELECTRIC ROTATING MACHINE

(75) Inventors: Takafumi Kotani, Saitama (JP);
Kazuhiro Togawa, Saitama (JP);
Yasuhiro Shinkawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 12/286,785

(22) Filed: Oct. 2, 2008

(65) Prior Publication Data
US 2009/0102311 A1    Apr. 23, 2009

(30) Foreign Application Priority Data
Oct. 19, 2007   (JP) ............... 2007-272640

(51) Int. Cl.
*H02K 1/12* (2006.01)
(52) U.S. Cl. .................... 310/215; 310/194
(58) Field of Classification Search .......... 310/215, 310/194, 254.1, 214
See application file for complete search history.

(56) References Cited
U.S. PATENT DOCUMENTS
5,763,978 A * 6/1998 Uchida et al. ............. 310/215

| | | | |
|---|---|---|---|
| 7,340,822 B2 * | 3/2008 | Yamamura et al. | 29/598 |
| 2005/0194859 A1 * | 9/2005 | Lee | 310/216 |
| 2007/0001525 A1 * | 1/2007 | Schneider et al. | 310/71 |

FOREIGN PATENT DOCUMENTS

JP    2006-340581    12/2006

* cited by examiner

*Primary Examiner*—Quyen Leung
*Assistant Examiner*—Leda Pham
(74) *Attorney, Agent, or Firm*—Carrier, Blackman & Associates PC; Joseph P. Carrier; William D. Blackman (57) ABSTRACT

In an insulator to be inserted into each slot to be attached to adjacent teeth formed at a rotor or a stator of an electric rotating machine, the insulator is composed of insulator segments that are made divisible in a longitudinal direction parallel to a rotational axis of the rotor at a position corresponding to 2 slots and are made divisible in a lateral direction perpendicular to the rotational axis of the rotor, the insulator segments have surfaces to be coupled to each other of a same shape in the lateral direction, and the insulator segments have a creepage distance that is made longer than a distance in the lateral direction, thereby enabling to elongate the creepage distance and to improve work efficiency.

21 Claims, 5 Drawing Sheets

INSULATOR FOR ELECTRIC ROTATING MACHINE

BACKGROUND OF THE INVENTION

1. Field of the Invention

This invention relates to an insulator for electric rotating machine such as a generator, an electric motor and the like, particularly to the structure of an insulator to be inserted in a slot to be attached to the adjacent teeth of a rotor or a stator of the machine.

2. Description of the Related Art

As the structure of an insulator inserted in a slot to be attached to the adjacent teeth of a rotor or a stator of an electric rotating machine such as a generator, an electric motor and the like, a technique disclosed by, for example, Japanese Laid-open Patent Application No. 2006-340581 ('581) is known. In '581, the insulator is provided for each tooth, and is made divisible into two parts, i.e., right and left segments in a longitudinal direction parallel to a rotational axis of a rotor such that wire winding is facilitated.

It is preferable for the insulator of divisible-type to have the same shape of coupling surfaces at the ends of divided segments from a view of work efficiency. It is also preferable for the insulator to have an elongated creepage distance (the minimum distance along surface of a dielectric between two conductive parts). In this regard, in the technique of the reference, although the creepage distance is sufficient, since the insulator is made divisible longitudinally, the shape of coupling surfaces becomes different from each other, causing dissatisfaction in work efficiency.

SUMMARY OF THE INVENTION

An object of this invention is therefore to overcome the aforesaid problem and to provide an insulator for electric rotating machine equipped of a divisible-type whose creepage distance is elongated, while improving work efficiency.

In order to achieve the object, the present invention provide an insulator to be inserted into each slot to be attached to adjacent teeth formed at one of a rotor and a stator of an electric rotating machine such that a winding is wound around thereon, wherein the improvement comprises that: the insulator is composed of insulator segments that are made divisible in a longitudinal direction parallel to a rotational axis of the rotor at a position corresponding to 2n (n≧1) slots and are made divisible in a lateral direction perpendicular to the rotational axis of the rotor, the insulator segments have surfaces to be coupled to each other of a same shape in the lateral direction; and the insulator segments have a creepage distance that is made longer than a distance in the lateral direction.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An insulator for electric rotating machine according to preferred embodiments of this invention will now be explained with reference to the drawings.

Figure 1:
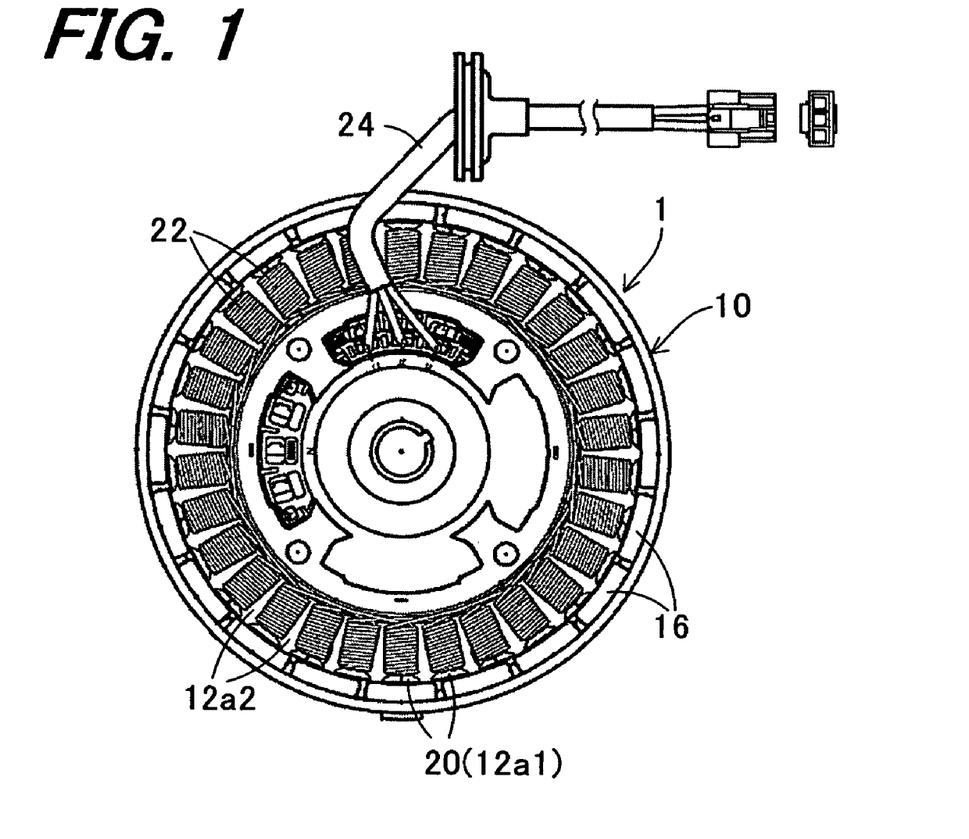
FIG. 1 is an overall plan view of an electric rotating machine in which an insulator according to a first embodiment of this invention is attached.
Figure 2:
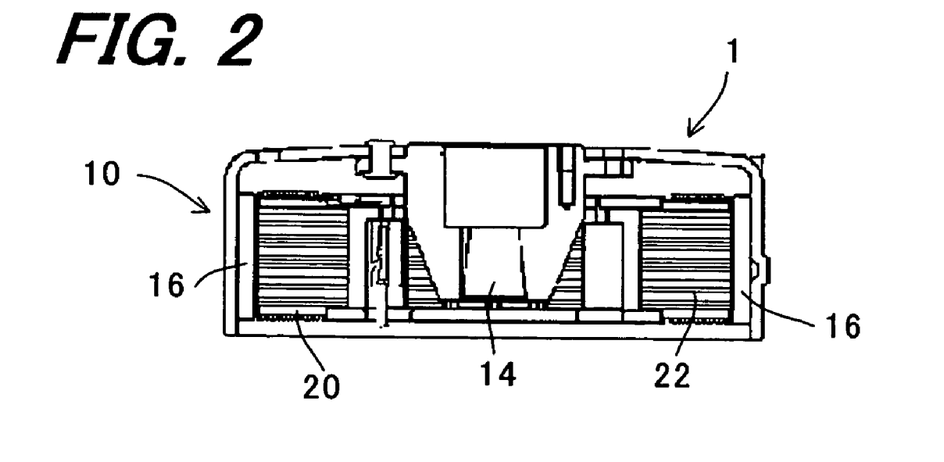
FIG. 2 is a side view of the machine shown in FIG. 1.
Figure 3:
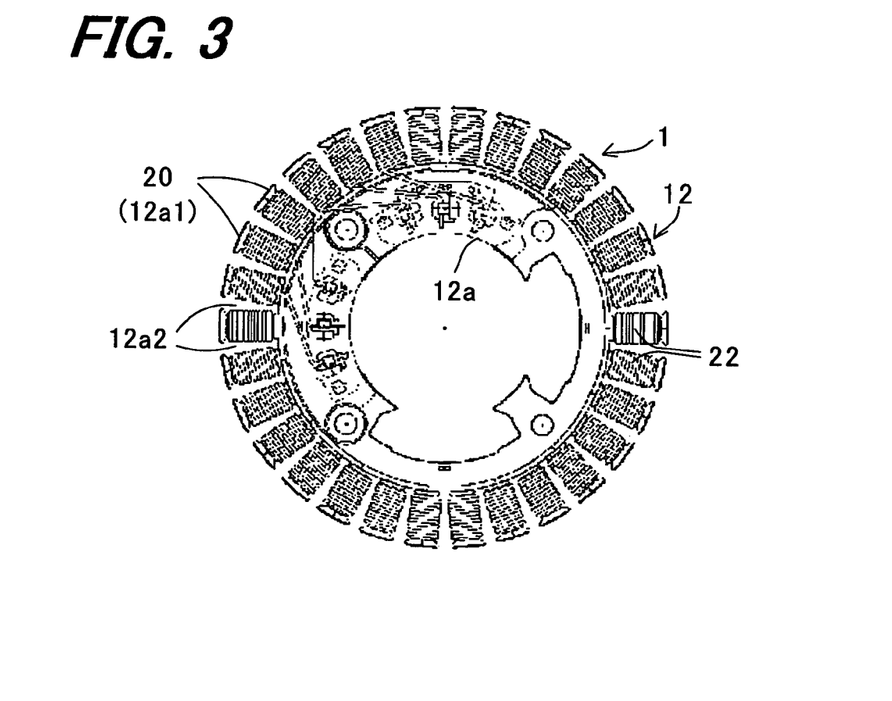
FIG. 3 is an enlarged plan view of a stator shown in FIG. 1.
Figure 4:
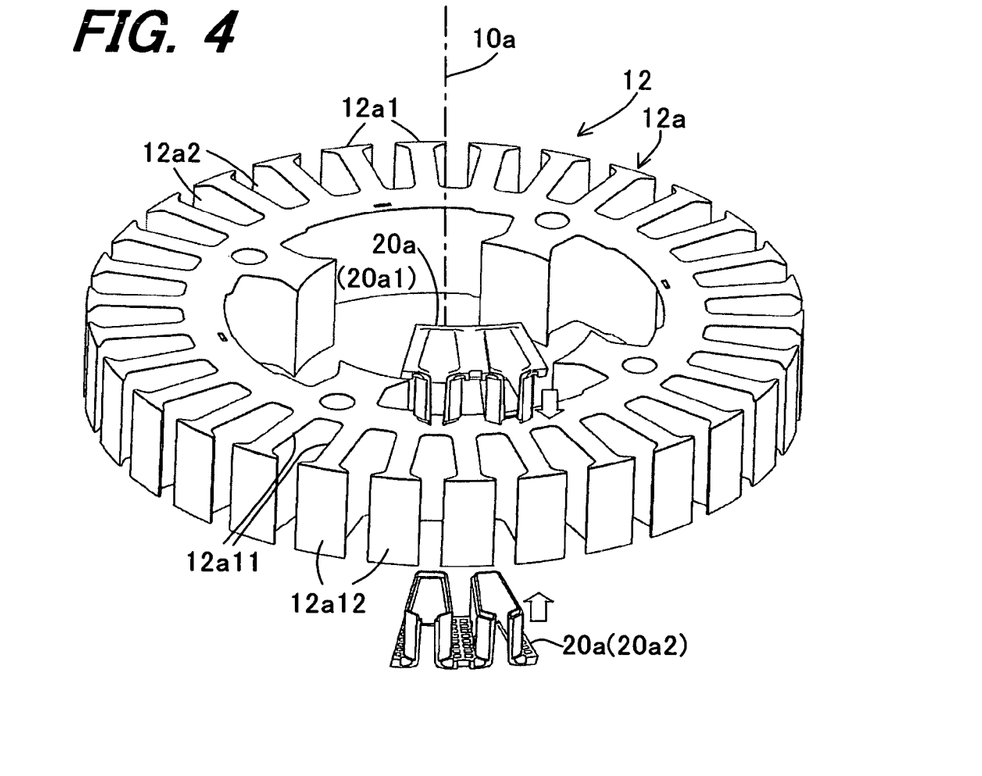
FIG. 4 is an explanatory perspective view showing an insulator and a stator core and the like of the stator shown in FIG. 3.

FIG. 1 is an overall plan view of an electric rotating machine to which the insulator according to a first embodiment of this invention is attached, FIG. 2 is a side view thereof, FIG. 3 is an enlarged plan view of a stator and FIG. 4 is an explanatory perspective view showing an insulator and a stator core and the like of the stator shown in FIG. 3.

As shown in FIGS. 1 to 3, the electric rotating machine (assigned by reference numeral 1) is equipped with a rotor 10 installed on the outer side and a stator 12 facing thereto installed on the inner side. The rotor 10 is attached to a crankshaft 14 of an internal combustion engine. Twenty pieces of permanent magnets 16 are arranged with alternating the polarity on the inner periphery of the rotor 10.

As shown in FIG. 4, the stator 12 includes a stator core 12a that is formed with a plurality of, i.e., thirty teeth 12a1 and slots 12a2 of the same number between the teeth 12a1. The stator core 12a is made up of steel plates in a stacked arrangement. Each of the teeth (tooth) 12a1 of T-shape includes a body 12a11 extending in a radial direction and a head 12a12 formed integrally with the body 12a11 on the circumference side.

The body 12a11 of the tooth 12a1 of the stator core 12a is attached or covered with an insulator (bobbin) 20. The insulator 20 is inserted into the slot 12a2 to be attached to the tooth 12a1 and a winding (coil) 22 composed of fine electric wire (enamel wire) is wound around it.

As illustrated, the electric rotating machine 1 is configured as an engine generator of outer rotor type. When the rotor 10 is rotated with rotation of the crankshaft 14 of the engine so that the winding 22 of the stator 12 crosses the flux emitted from the permanent magnet pieces 16 installed at the rotor 10, electromotive force (alternating-current) is generated in the winding 22. The electromotive force thus generated is taken out as three-phase alternating-current through three output lines 24.

Since the insulator 20 for the electric rotating machine 1 according to the first embodiment is characterized by its structure, the explanation thereon will be made in detail.

Figure 5:
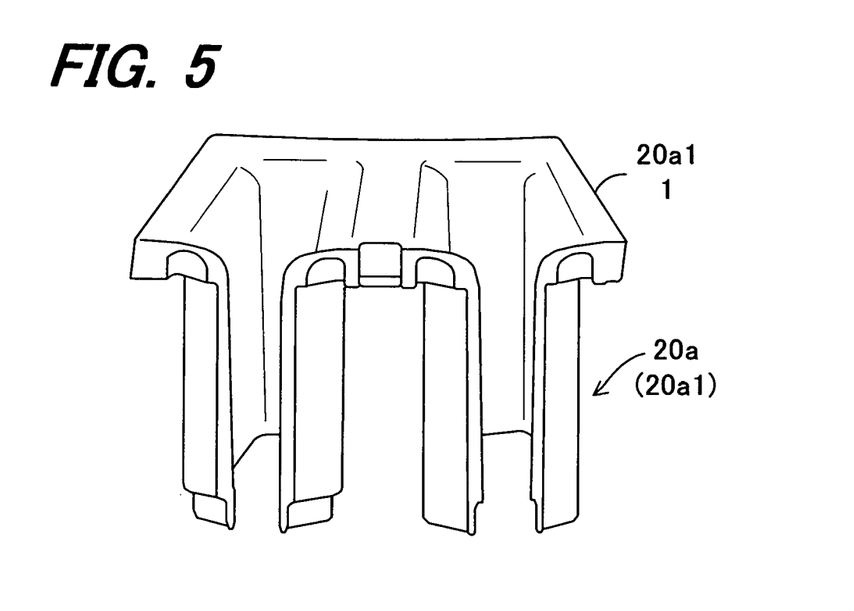
FIG. 5 is an enlarged perspective view of an upper insulator segment of the insulator shown in FIG. 4.
Figure 6:
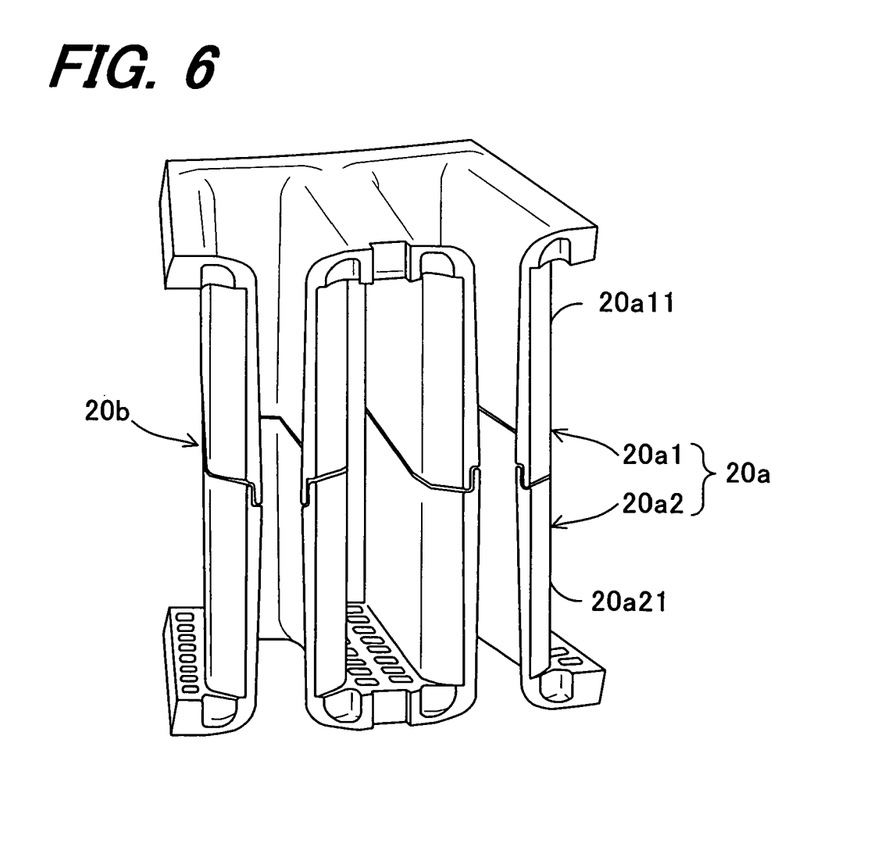
FIG. 6 is an enlarged perspective view of the insulator composed of the upper insulator segment and an lower insulator segment shown in FIG. 4.
Figure 7:
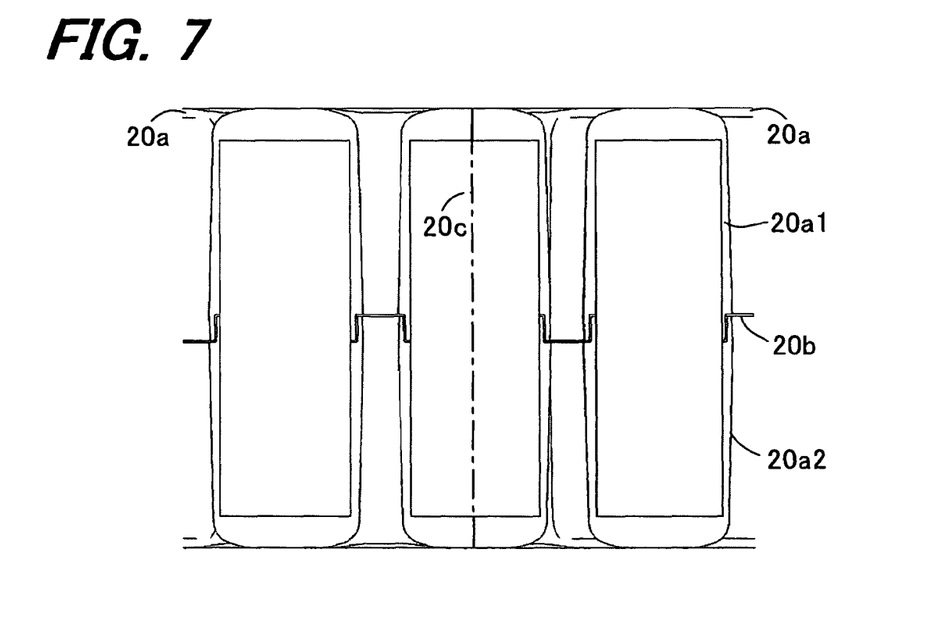
FIG. 7 is a front view of the insulator in which two pairs of insulator segments arranged right and left shown in FIG. 6 are connected in a lateral direction.
Figure 8:
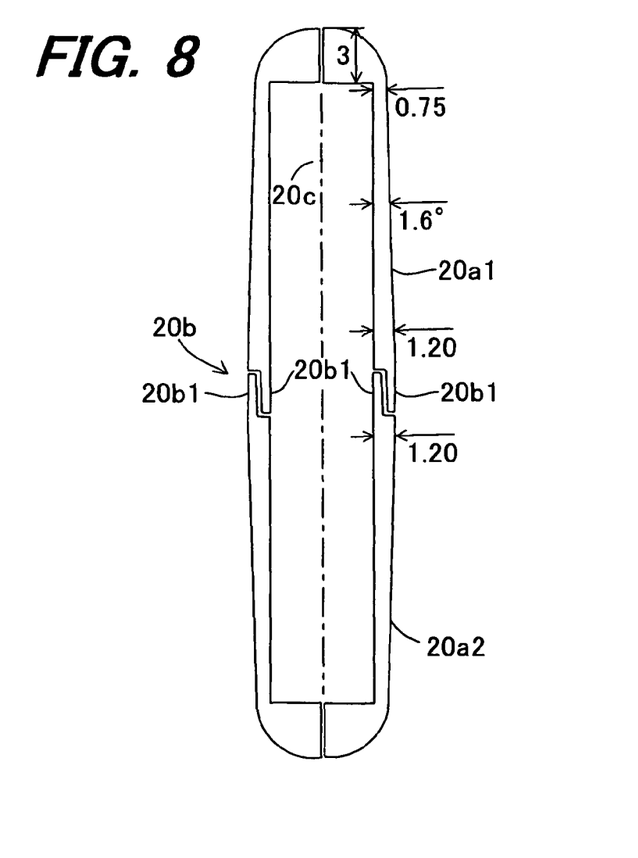
FIG. 8 is an enlarged front view showing connecting regions of the insulator segments shown in FIG. 7.
Figure 9:
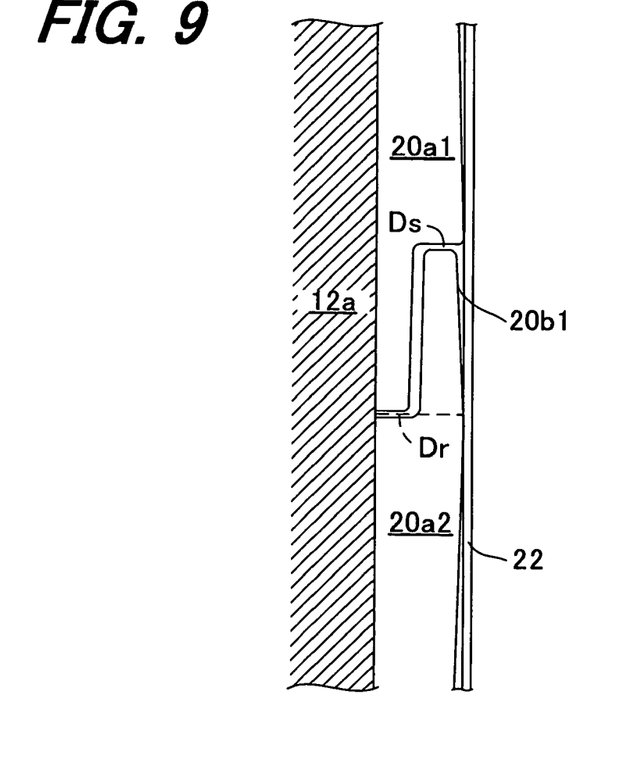
FIG. 9 is an enlarged front view showing the vicinity of coupling surfaces of the insulator segments shown in FIG. 7.

FIG. 5 is an enlarged perspective view of an upper insulator segment 20a1 shown in FIG. 4, FIG. 6 is an enlarged perspective view of the insulator composed of the upper insulator segment 20a1 and an lower insulator segment 20a2 shown in FIG. 4, FIG. 7 is a front view of the insulator 20 (20a) in which two pairs of insulator segments arranged right and left shown in FIG. 6 etc. are connected in a lateral or horizontal direction, FIG. 8 is an enlarged front view showing connecting regions of the insulator segments 20a shown in FIG. 7 and FIG. 9 is an enlarged front view showing the vicinity of coupling surfaces of the insulator segments 20a shown in FIG. 7.

As illustrated, the insulator 20 is made divisible in the longitudinal or vertical direction parallel to the rotational axis 10a (shown in FIG. 4) of the rotor 10 at each region corresponding to the 2n (n≧1) slots 12a2, while is also made divisible in the lateral or horizontal direction perpendicular to the rotational axis 10a of the rotor 10. In this embodiment, since n=1, the insulator 20 can be divided in the longitudinal direction at every two slots 12a2. The insulator 20 is made of insulating resin, specifically Nylon (registered trademark), more specifically Zylon FR50® (also known as PA66).

Since the number of the slots 12a2 is thirty, the insulator 20 is made divisible into fifteen insulator segments 20a in the longitudinal direction. Further, the insulator segments 20a are each made divisible in the lateral direction into two, i.e., the upper insulator segment 20a1 and lower insulator segment 20a2. The upper and lower insulator segments 20a1, 20a2 include main bodies 20a11, 20a21 of substantially M-shape or inverted M-shape and coupling surfaces (surfaces to be coupled) 20b at the ends thereof.

As shown in FIG. 6, when the upper and lower insulator segments 20a1, 20a2 are assembled, the insulator segment 20a is formed at its center with an absolute space by the bodies 20a11, 20a21, which is corresponding to the body 12a11 of one tooth 12a1, and spaces are formed one by one between the bodies 20a11, 20a21 and main bodies of another insulator segment 20a lying adjacent thereto on the right or left side.

As shown in FIG. 4, the insulator segment 20a is fixed to the teeth 12a1 by inserting the upper and lower insulator segments 20a1, 20a2 from above and below the stator core 12a (in the direction parallel to the rotational axis 10a of the rotor 10) into the two adjacent slots 12a2 and housing or accommodating each tooth 12a1 in the foregoing space. As shown in FIG. 7, the insulator segments 20a are made consecutively connectable in series in the lateral direction with boundary lines 20c.

As shown in FIGS. 6 to 8, the insulator segment 20a is configured such that the coupling surfaces 20b at the ends of the upper and lower insulator segments 20a1, 20a2, which are made laterally divisible, have the same shape, specifically, the coupling surfaces 20b of the upper and lower insulator segments 20a1, 20a2 have a cranked shape so that the same cranked portions 20b1 face each other.

More specifically, as can be clearly seen if turning any of the drawings of FIGS. 6 to 8 upside down, the upper surface and lower surface to be coupled 20b of the segments 20a1, 20a2 are formed in the same shape. Further, in addition to the coupling surfaces 20, the upper and lower insulator segments 20a1, 20a2 are configured to have the main bodies 20a11, 20a21 of the same shape.

Thus, although there are two types of shapes of the coupling surfaces, since the upper and lower insulator segments 20a1, 20a2 have the same structure, installation mistake can not happen during assembly operation. In other words, it becomes possible to prevent the installation mistake from happening during assembly operation, thereby improving work performance.

The foregoing configuration will be further explained.

As shown in FIG. 5, in the upper insulator segment 20a1, the inner wall side projects to form the cranked portions 20b1 on the left side and the outer wall side projects on the right side. As can be seen in FIG. 6, in the lower insulator segment 20a2, the walls to be projected are configured inversely. Since the cranked portions 20b1 of the upper or lower insulator segment 20a1, 20a2 are made different in structure, the entire insulator segment 20a can have the same shape as a whole.

Further, as shown in FIG. 9, in the insulator segment 20a, a creepage distance (the minimum distance along surface of a dielectric between two conductive parts) Ds of the coupling surfaces 20b is configured to exceed a distance Dr in the lateral direction. Specifically, the coupling surfaces 20b have not a shape formed by laterally cutting straight but the cranked shape, so the creepage distance Ds can be elongated by a length that exceeds the distance Dr in the lateral direction.

As shown in FIG. 8, wall thickness of the main bodies 20a11, 20a21 of the insulator segment 20a on the side of ends opposite from the coupling surfaces 20b is configured to be 0.75 mm and the wall thickness is made increased gradually toward the coupling surfaces 20b (precisely, at an inclination of 1.6 degrees) and is 1.2 mm in the vicinity of the coupling surfaces 20b. In this case, the creepage distance needs to be 2.4 mm or more, and, owing to the cranked shape, this embodiment can ensure the creepage distance Ds.

Further, as shown in FIGS. 8 and 9, in the region of the coupling surfaces, the cranked portions 20b1 on the outer periphery side of the upper and lower insulator segments 20a1, 20a2 have an inclined shape, i.e., are tapered toward the inner periphery with a slight inclination, e.g., at an inclination of 1.9 degrees.

As a result, when the winding 22 is wound around the insulator segments 20a1, 20a2, the winding 22 does not make contact with the cranked portion as shown in FIG. 9, thereby enabling to prevent the stress due to tension of the winding 22 from affecting the cranked portion 20b1 on the outer periphery side.

In other words, the coupling surfaces 20b in the cranked shape can increase in the creepage distance Ds and since they are constituted of the cranked portions 20b1 that are thinner in thickness than the main bodies 20a11, 20a21, the cranked portion 20b1 on the outer periphery side is provided with inclination to avoid the stress of the wire 22 from exerting thereon. As is seen from FIG. 8 and other views, the cranked portion 20b1 on the outer periphery side is alternated at the upper and lower insulator segments 20a1, 20a2.

As stated in the foregoing, the first embodiment is configured to have an insulator (20) to be inserted into each slot (12a2) to be attached to adjacent teeth (12a1) formed at one of a rotor (10) and a stator (12) of an electric rotating machine (1) such that a winding (22) is wound around thereon, characterized in that: the insulator (20) is composed of insulator segments (20a) that are made divisible in a longitudinal direction parallel to a rotational axis (10a) of the rotor (10) at a position corresponding to 2n (n≧1) slots (12a2) and are made divisible in a lateral direction perpendicular to the rotational axis (10a) of the rotor (10), the insulator segments (20a) have surfaces to be coupled (20b) to each other of a same shape in the lateral direction; and the insulator segments (20a) have a creepage distance (Ds) that is made longer than a distance in the lateral direction (Dr).

With this, since the coupling surfaces 20b at the ends of the upper and lower insulator segments 20a (which are made divisible in the lateral direction) have the same shape, it becomes possible to prevent an installation mistake from happening during assembly operation, thereby improving work efficiency. In addition, since the creepage distance Ds is configured to exceed the lateral distance Dr, the creepage distance Ds can be elongated by a length that exceeds the distance Dr in the lateral direction.

Further, depending on the material to fabricate the insulator, the insulator 20 may be cracked due to heat distortion. However, the insulator 20 is configured to be divisible into the fifteen insulator segments 20a, thereby preventing such a crack from occurring.

Further, since the surface 20b to be coupled has a cranked shape, in addition to the foregoing effects, the length of the creepage distance Ds can be surely increased.

Further, since the wall thickness of each of the insulator segments 20a increases gradually toward the surface 20b to be coupled, in addition to the foregoing effects, the length of creepage distance can be still more increased. And, by increasing the wall thickness gradually, in other words by not increasing the wall thickness greatly, it becomes possible to form an appropriate gap therebetween, thereby enabling to enhance smooth wire winding.

Figure 10:
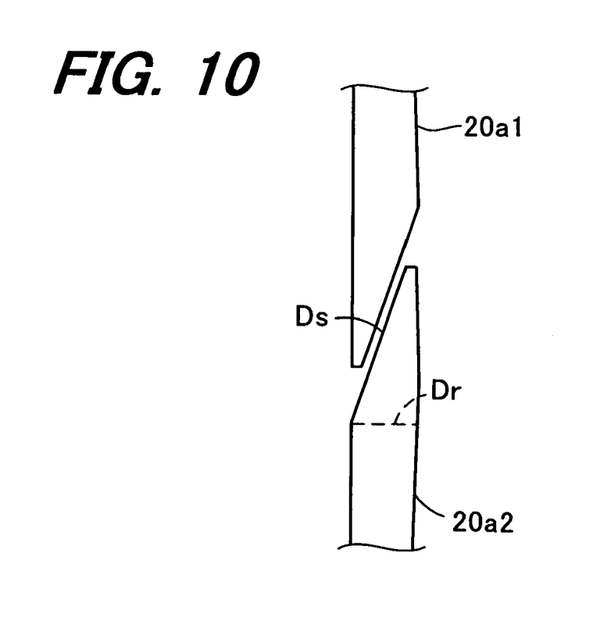
FIG. 10 is an explanatory view showing a shape of coupling surfaces of insulator segments of an insulator for electric rotating machine according to a second embodiment of this invention.

FIG. 10 is an explanatory view showing the shape of coupling surfaces 20b of the insulator segment 20a for electric rotating machine according to a second embodiment of this invention.

In the second embodiment, as illustrated, the coupling surfaces 20b of the insulator segment 20a have a tapered shape. With this, similarly to the first embodiment, the creepage distance Ds can be elongated by a length that exceeds the distance Dr in the lateral direction. The remaining configuration is the same as that in the first embodiment.

In the foregoing, the electric rotating machine is exemplified by a generator of outer rotor type, but it is not limited thereto and can be applied to electric motors. Further, although a configuration forming the teeth at the stator is taken as an example, the teeth can be installed at the rotor.

Japanese Patent Application No. 2007-272640 filed on Oct. 19, 2007, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An insulator to be inserted into each slot to be attached to adjacent teeth formed at one of a rotor and a stator of an electric rotating machine such that a winding is wound around thereon, wherein the improvement comprises that:

the insulator is composed of insulator segments that are made divisible in a circumferential direction with respect to the rotor at a position corresponding to 2n (n≧1) slots and are made divisible in a lateral direction perpendicular to the rotational axis of the rotor, the insulator segments have surfaces to be coupled to each other of a first and a second shape in the circumferential direction such that the surfaces alternate between the first and second shape.

2. The insulator according to claim 1, wherein the insulator segments are made divisible in the circumferential direction at a position corresponding to 2 slots.

3. The insulator according to claim 1, wherein the surface to be coupled has a cranked shape.

4. The insulator according to claim 1, wherein the surface to be coupled has a tapered shape.

5. The insulator according to claim 1, wherein wall thickness of each of the insulator segments increases gradually toward the surface to be coupled.

6. The insulator according to claim 1, wherein each segment comprises a main body and a plurality of slot filling portion extending therefrom, wherein each slot filling portion includes one of the surfaces to be coupled disposed thereon.

7. An insulator segment configured to fit within less than all the slots of a rotor or stator of an electric rotating machine, comprising:

a main body;

a plurality of slot filling portions extending from the main body; and a coupling surface disposed on an end of each slot filling portion, wherein the segment is configured to couple with an identical insulator segment, arranged in a laterally inverse orientation, and wherein the plurality of slot filling portions is configured to fill a proper subset of the slots of the rotor or stator.

8. The insulator segment according to claim 7, wherein the coupling surface includes one of a first shape and a second shape such that the coupling surfaces of the plurality of slot filling portions alternate between the first and the second shape in a circumferential direction with respect to the stator or rotor.

9. The insulator segment according to claim 8, wherein the number of slot filling portions corresponds to 2n with n≧1, and the coupling surfaces of the plurality of slot filling portions having an alternating pattern corresponding to m consecutive surfaces having the first shape and followed by m consecutive surfaces having the second shape, with m≧1 and n being evenly divisible by m.

10. The insulator segment according to claim 7, wherein the coupling surface has a cranked shape.

11. The insulator segment according to claim 7, wherein the coupling surface has a tapered shape.

12. The insulator segment according to claim 7, wherein wall thickness increases gradually toward the surface to be coupled.

13. An insulator to be inserted into the slots of a rotor or stator of an electric rotating machine, comprising:

an upper insulator including a first plurality of physically severable segments circumferentially abutting each other; and a laterally lower insulator including a second plurality of physically severable segments circumferentially abutting each other, wherein each segment of the first plurality is a lateral inverse of each segment of the second plurality.

14. The insulator according to claim 13, wherein:

each segment of the first and second pluralities of segments are physically identical.

15. The insulator segment according to claim 13, wherein each segment is configured to fill a proper subset of the slots of the rotor or stator.

16. The insulator according to claim 13, further comprising:

a plurality of slot filling portions disposed on each segment; and a coupling surface disposed on an end of each slot filling portion.

17. The insulator segment according to claim 16, wherein the coupling surface includes one of a first shape and a second shape such that the coupling surfaces of the plurality of slot filling portions alternate between the first and the second shape in a circumferential direction with respect to the stator or rotor.

18. The insulator segment according to claim 17, wherein the number of slot filling portions corresponds to 2n with n≧1, and the coupling surfaces of the plurality of slot filling portions having an alternating pattern corresponding to m consecutive surfaces having the first shape and followed by m consecutive surfaces having the second shape, with m≧1 and n being evenly devisable by m.

19. The insulator segment according to claim 16, wherein the surface to be coupled has a cranked shape.

20. The insulator segment according to claim 16, wherein the surface to be coupled has a tapered shape.

21. The insulator according to claim 1, wherein the insulator segments have a creepage distance that is made longer than a distance in the lateral direction.

* * * * *

UNITED STATES PATENT AND TRADEMARK OFFICE
CERTIFICATE OF CORRECTION

| | |
|---|---|
| PATENT NO. | : 7,825,563 B2 |
| APPLICATION NO. | : 12/286785 |
| DATED | : November 2, 2010 |
| INVENTOR(S) | : Kotani et al. |

It is certified that error appears in the above-identified patent and that said Letters Patent is hereby corrected as shown below:

Column 6:
　　Line 9, change "filing" to --filling--.
　　Line 57, change "filing" to --filling--.

Column 7:
　　Line 4, change "devisable" to --divisible--.

Signed and Sealed this
Eighth Day of March, 2011

David J. Kappos
*Director of the United States Patent and Trademark Office*